United States Patent Office 2,978,447
Patented Apr. 4, 1961

2,978,447

PREPARATION OF p-AMINOBENZYL PENICILLIN AND DERIVATIVES THEREOF

Anthony L. Tosoni and Peter J. Moloney, Toronto, Ontario, Canada, Louis Goldsmith, Park Forest, Ill., and Douglas G. Glass, Toronto, Ontario, Canada, assignors to The Governors of the University of Toronto, Toronto, Ontario, Canada, a corporation of Canada No Drawing. Filed July 11, 1960, Ser. No. 41,768

6 Claims. (Cl. 260—239.1)

This invention relates to a process for producing p-aminobenzyl penicillin and derivatives thereof; and to the preparation of p-aminobenzyl penicillin in relatively pure, crystalline state and in good yield.

This application is a continuation-in-part of our prior application Serial No. 654,651, filed April 24, 1957, now abandoned.

p-Aminobenzyl penicillin has been mentioned in the literature. In a summary of the biosynthesis of penicillin by Otto K. Behrens (The Chemistry of Penicillin, Princeton University Press, 1949, page 672) it is noted: "The Imperial College Group report, in a contribution prepared for inclusion in this chapter, the attempted biosynthesis of p-aminobenzyl penicillin, o-bromobenzyl penicillin, p-iodobenzyl penicillin, and a-naphthylmethyl penicillin. None of these attempts was successful." In Applied Microbiology, volume 1, page 163, 1953, Brewer and Johnson report work which indicates that p-aminobenzyl penicillin would have desirable properties, but which fails to indicate how that penicillin can be prepared effectively. It is evident from these reports that p-aminobenzyl penicillin had been prepared only with difficulty and in poor yield of highly impure material. This is confirmed in an editorial appearing in Antibiotic Medicine, volume 1, page 488, September 1955, in which p-aminobenzyl penicillin is referred to as "at present a laboratory curiosity." More recently, in Nature, volume 183, January 17, 1959, page 180, A. Ballio, E. B. Chain et al. have reported that they prepared p-aminobenzyl penicillin biosynthetically but were able to obtain only an impure amorphous material.

In the art of producing penicillin, it is generally conceived and taught that if one wishes to make a penicillin containing a specific characterizing grouping, the method to be followed is to proceed in the usual way for producing penicillin by the biological mold-growth process, sometimes referred to as biosynthesis, and to supply in the mold broth a selected precursor compound which has the desired characterizing grouping attached to a carrier grouping, such as the acetic acid grouping, which the mold utilizes; and by this means to induce the mold to produce a penicillin having the desired characterizing grouping. This is the method attempted in the literature noted above. In the case of a hydrophilic penicillin, and specifically p-aminobenzyl penicillin, while the penicillin can undoubtedly be produced in the mold broth by this biosynthetic procedure, its hydrophilic nature makes it extremely difficult, and impractical, to recover and separate the penicillin so produced from the mold broth and from various undesired constituents co-present in that broth.

In accordance with our invention, in contrast to such teaching of the prior art, we deliberately produce by the biosynthetic procedure a penicillin which is different from the desired penicillin but which is recoverable in good yield and relatively pure state from the biosynthetic mold broth by convenient methods, as by extraction with non-polar solvents under acidic conditions; and we then convert the isolated biosynthetically produced penicillin to the desired penicillin by chemical means. In particular, in the preparation of the hydrophilic p-aminobenzyl penicillin, we initially produce by the usual biosynthetic procedure the relatively non-hydrophilic p-nitrobenzyl penicillin, and we reduce that relatively non-hydrophilic penicillin to the hydrophilic p-aminobenzyl penicillin, preferably by catalytic hydrogenation. In this way, the desired p-aminobenzyl penicillin is readily obtained in good yield and in crystalline state. Various derivatives may be prepared therefrom by chemical means.

Accordingly, it is an object of our invention to prepare the hydrophilic p-aminobenzyl penicillin by chemical transformation from a relatively less hydrophilic penicillin, preferably from a penicillin which is readily prepared by biosynthetic methods and is readily recovered in relatively pure and desirably in crystalline form. It is a particular object of our invention to prepare p-aminobenzyl penicillin by the reduction of p-nitrobenzyl penicillin, especially by catalytic hydrogenation of p-nitrobenzyl penicillin. It is an object of the invention thereby to make available various derivatives of the p-aminobenzyl penicillin.

p-Nitrobenzyl penicillin is desirably used as the intermediate or starting material for conversion to the desired p-aminobenzyl penicillin. The p-nitrobenzyl penicillin is known, as from Behrens et al. Patent No. 2,479,296. It is relatively non-hydrophilic, and on chromatographic analysis appears in the penicillin G zone. It can be prepared by biosynthesis, using, for example, p-nitrophenyl acetic acid as the precursor; and can be recovered and purified by methods commonly used with penicillin G. Also by methods corresponding to those used with penicillin G, the p-nitrobenzyl penicillin can be obtained in the form of the acid and of various carboxyl derivatives thereof.

The p-nitrobenzyl penicillin used is desirably in a highly purified state, and it is an advantage of our process that a high degree of purification can be done in advance on the relatively non-hydrophilic penicillin, especially to free it of hydrophilic contaminants, so that upon conversion the hydrophilic p-aminobenzyl penicillin is obtained substantially free of hydrophilic contaminants.

The p-nitrobenzyl penicillin used can be in the form of the acid or in the form of various soluble carboxyl derivatives thereof in which the carboxyl substituent is a hydrogenation-compatible substituent, that is, one which is compatible with the existence of catalytic hydrogenation conditions and (whether or not it is itself affected by such conditions) does not by its presence affect the operation of such conditions as to hinder a hydrogenation reaction involving other substituents such as the nitro radical copresent in a reaction mixture. Such carboxyl derivatives, beside the acid, include the various soluble metal salts such as the alkali-metal salts exemplified by the sodium and potassium salts, and the alkaline earth metal salts exemplified by the calcium salt, all of which salts are known for various penicillins and can be prepared in known way for the p-nitrobenzyl penicillin. We prefer to use the alkali metal salts, and by this term we mean to include the ammonium salt, which acts like a salt of an alkali metal.

Other suitable carboxyl derivatives are the lower alkyl esters, that is, esters in which the esterifying group is an alkyl group having up to five carbon atoms, such as the methyl ester, the ethyl ester, etc. Such esters can be prepared by methods analogous to those used in preparing the corresponding esters of penicillin G.

Suitable carboxyl derivatives of p-nitrobenzyl penicillin also include soluble amine salts formed by hydrogenation-compatible amine cations. Such amine salts comprise hydrocarbon amine salts which may also be called hydrocarbon substituted ammonium salts, and as such consist of the ammonium salt, which is mentioned above as acting like an alkali metal salt, with hydrocarbon substituents replacing one or more hydrogen atoms of the ammonium radical, depending on whether the hydrocarbon amine is a primary, secondary, or tertiary amine. Hydrogenation-compatible amine cations thus comprise those in which one or more of the amine substituents (which replace the hydrogen of the ammonium radical) are hydrocarbon radicals. Such amine cations include those containing aliphatic radicals such as alkyl radicals exemplified in the methylamine salt, the triethylamine salt, the dodecylamine salt, etc., and such as alkenyl radicals exemplified in the allyl (or propenyl) amine salt, the butenyl amine salt, etc., and include phenyl-substituted aliphatic radicals exemplified in the benzylamine salt. Such amine cations also include aliphatic hydrocarbon amines such as those containing a cyclohexyl radical or as is exemplified by the piperidine salt in which a 5-carbon hydrocarbon chain is connected at both ends to the amine nitrogen.

The various amine salts of p-nitrobenzyl penicillin are prepared by methods illustrated in the examples given below.

Conversion of the p-nitrobenzyl penicillin to the desired p-aminobenzyl penicillin is effected by reduction, preferably by hydrogenating the p-nitrobenzyl penicillin in a suitable solvent with hydrogen in the presence of a catalyst.

Common penicillin solvents may be used in the hydrogenation reaction, particularly low molecular weight solvents which either alone or with co-present water dissolve the p-nitrobenzyl penicillin compound used and which are inert, that is, are non-reactive in the mixture and non-destructive to the penicillin. The solvent used may vary with the form of the p-nitrobenzyl penicillin used. When the p-nitrobenzyl penicillin is in the form of a salt, the solvent is desirably water or a lower alkanol, e.g., one having not more than five carbon atoms, or a mixture of such solvents. When the p-nitrobenzyl penicillin is in the form of the acid, the solvent is desirably an alkanoic acid alkyl ester having a total of not more than five carbon atoms, or mixtures thereof.

The hydrogenation is catalyzed by catalysts of the platinum-metal group, including for example, various palladium catalysts such as palladium itself and palladium on a carrier such as carbon, and various platinum catalysts such as platinum itself, platinum on a carrier such as alumina, and platinum oxide (Adam's catalyst), etc.

The hydrogenation is desirably carried out in a stainless steel or other inert reactor. The hydrogenation reaction occurs at normal pressures, but is conveniently carried out at elevated pressure. It is desirably carried out at a moderate temperature, preferably below about 90° F., in order to avoid harmful action of heat.

The hydrogenation converts the nitro radical of the p-nitrobenzyl penicillin to the amino radical, substantially leaving the penicillin otherwise intact, and thus produces the corresponding p-aminobenzyl penicillin. This latter is separated from the reaction mixture. For example, the reaction mixture may be filtered to remove the catalyst, and to yield the p-aminobenzyl penicillin in the filtrate solution, and such solution may be used as such. Preferably, however, the p-aminobenzyl penicillin is recovered from the filtrate solution, desirably in the form of a carboxyl derivative, for example, as a salt, such as the potassium salt, the ammonium salt, the sodium salt, the calcium salt, etc. When the penicillin is obtained in the form of the acid in organic solution, it can be reacted with an alkali to form a salt, and the salt extracted into aqueous solution. When it is obtained as a salt in aqueous solution or in aqueous organic solution, either directly or by extraction, it can be recovered by evaporation, are by precipitation. Thus, it can easily be recovered in solid state and usually in crystalline state.

For example, in a preferred form of the process, we use an alkali-metal salt of p-nitrobenzyl penicillin in aqueous iso-propanol as the solvent, and we recover the p-aminobenzyl penicillin alkali-metal salt by filtering the reaction mixture to remove the catalyst, and then evaporating the filtrate to reduce its water content to less than 5%, which causes the p-aminobenzyl penicillin to precipitate as a crystalline solid, which is recovered.

The p-aminobenzyl penicillin produced has antibiotic penicillin activity, and is useful as a therapeutic agent. In addition, it is useful as an intermediate for the production of other penicillin derivatives. For this purpose, it is outstanding among known penicillins in that it not only has a carboxyl functional group like other penicillins, but in addition has a functional and reactive amino group in the p-aminobenzyl moiety. Our invention thus makes available various active penicillin derivatives from the p-aminobenzyl penicillin.

The following examples illustrate the invention:

EXAMPLE 1

*Potassium p-aminobenzyl penicillin. Aqueous ethyl alcohol solvent. Carbon-palladium catalyst*

The starting material was crystalline potassium p-nitrobenzyl penicillin which assayed 2107 units per mg. and which on chromatographic analysis showed 100% of its penicillin activity in the relatively non-hydrophillic penicillin G zone of chromatographic separation. A mixture of 100 grams of the potassium p-nitrobenzyl penicillin, 300 ml. of water, and 50 grams of 5% palladium-on-carbon catalyst was prepared in a stainless steel hydrogenation reactor. To this mixture, 2,700 ml. of absolute ethyl alcohol were added. The resulting mixture was then subjected to hydrogenation. For this, the reactor was evacuated and hydrogen was introduced to a pressure of about 15 p.s.i.g. The mixture was stirred vigorously, and when the absorption of hydrogen reduced the pressure to below about 7 p.s.i.g., additional hydrogen was added to bring the pressure back to about 15 p.s.i.g. The hydrogenation was continued until the rate of hydrogen absorption was substantially zero, which took about an hour and forty-five minutes. The hydrogenation mixture was filtered to remove the catalyst, the catalyst was washed with two 100 ml. portion of 90% ethyl alcohol, and the washings were added to the filtrate. The resulting filtrate solution had a volume of 3,040 ml. and a pH of 6.73, and contained about 70 million units of penicillin. Upon chromatographic analysis, 90.3% of the penicillin activity appeared in the zone where the hydrophilic penicillin X is normally found, as distinct from the penicillin G zone where the original p-nitrobenzyl penicillin appeared. This indicated a high degree of conversion of the p-nitrobenzyl penicillin to p-aminobenzyl penicillin.

The filtrate solution containing the p-aminobenzyl penicillin was flash evaporated in vacuo, at a temperature below 40° C., to a volume of 350 ml. Assay of the resulting aqueous concentrate showed it to contain substantially all the 70 million penicillin units originally obtained in the filtrate solution. Upon chromatographic analysis, 92.3% of the penicillin activity appeared in the hydrophilic penicillin X zone. The concentrate was stored in the frozen state, and was subsequently used to prepare crystalline p-aminobenzyl penicillin.

A 36 ml. portion of the concentrate obtained as set forth above was treated as follows: To the concentrate were added 54 ml. of amyl acetate (a technical grade available as "pentasol acetate") in a separatory funnel. The mixture was shaken and was then allowed to settle. Two layer formed, and the lower aqueous layer was separated. The upper acetate layer was washed with two 1 ml. portions of distilled water, and the washings were combined with the separated lower aqueous layer. The aqueous phase, containing the p-aminobenzyl penicillin in purified form and in further concentration, had a volume of 20 ml. To this, 300 ml. of absolute acetone was added slowly, with stirring. A precipitate formed which at first was gummy but which later solidified. The upper loose portion of this solid precipitate was poured into centrifuge cups and was separated from co-present liquid by centrifuging. The solid thus recovered was washed twice in acetone and then dried in vacuo. The dried material consisted of potassium p-aminobenzyl penicillin, in the form of crystalline rosettes.

The crystalline material assayed 824 units of penicillin per mg., and on chromatographic analysis, 93.1% of the activity appeared in the hydrophilic penicillin X zone, indicating that the penicillin present in the crystalline material obtained was substantially all p-aminobenzyl penicillin. This crystalline material was subjected to ultraviolet spectrophotometric analysis and was found to have absorption maxima at 238 millimicrons and at 285 millimicrons; which maxima correspond with maxima of 236 and 285 millimicrons found for p-aminophenyl acetic acid, and thus show the presence of the p-aminophenyl moiety in the crystalline product.

As a test for heat stability of the crystalline product, biological assays and chromatographic analysis were made before and after heating the crystalline material at 100° to 110° C. for a period of seventeen hours. The results showed no loss of potency and no significant change in the zone at which the penicillin activity appeared on chromatographic analysis.

A portion of the purified crystalline potassium p-aminobenzyl penicillin thus obtained was further analyzed by an independent research laboratory, which reported that infrared spectrophotometric analysis showed the lactam structure, amide grouping, and other characteristic penicillin functions to be present; that ultraviolet absorption data indicated the presence of the p-aminophenyl moiety; that titration showed both the basic p-amino group ($pK'_a$ 4.6) and the acidic carboxyl group ($pK'_a$ 2.6) to be present; and that X-ray diffraction studies indicated a crystalline structure.

EXAMPLE 2

*Potassium p-aminobenzyl penicillin. Precipitation from isopropanol*

A 178 ml. portion of the concentrate obtained in Example 1 was mixed with 256 ml. of amyl acetate ("pentasol acetate") in a separatory funnel, and the mixture was allowed to settle. Two layers formed. The lower layer was recovered, and the upper acetate layer was washed twice with 5 ml. of water and the washings combined with the lower layer. This gave a purified concentrate containing the p-aminobenzyl penicillin and having a total volume of 105 ml. This concentrate was added slowly with vigorous stirring to 2,000 ml. of isopropanol. A flocculent precipitate of p-aminobenzyl penicillin formed, and the mixture was placed in the refrigerator at 10° C. overnight. The next day, most of the supernatant liquid was drawn off, leaving a slurry containing the crystalline potassium p-aminobenzyl penicillin. This slurry was centrifuged to recover the solid precipitate, and the precipitate was washed once with isopropanol and twice with ether. (Some material was spilled and lost.) The washed precipitate was dried under vacuum and yielded 31 grams of crystalline potassium p-aminobenzyl penicillin.

This crystalline product assayed 750 units per mg., and on chromatographic analysis, 97.1% of the activity appeared in the hydrophilic penicillin X zone, indicating that the penicillin present in the crystalline material obtained was substantially all p-aminobenzyl penicillin. On spectrophotometric analysis, the crystalline p-aminobenzyl penicillin was found to have ultraviolet absorption maxima at 237 and 285 millimicrons, which maxima correspond with maxima of 236 and 285 millimicrons found for p-aminophenyl acetic acid, and thus show the presence of the p-aminophenyl moiety in the crystalline product.

As a test for heat stability of the crystalline product, biological assays and chromatographic analysis were made before and after heating the crystalline material at 100° to 110° C. for a period of seventeen hours. The results showed no loss of potency and no significant change in the zones at which the penicillin activity appeared on chromatographic analysis.

A portion of this crystalline p-aminobenzyl penicillin was further analyzed by the same independent research laboratory, with the same results, as in Example 1.

EXAMPLE 3

*Potassium p-aminobenzyl penicillin. Aqueous isopropanol solvent. Carbon-palladium catalyst*

Crystalline potassium p-nitrobenzyl penicillin was used as the starting material. To 100 grams of such starting material in a 16-litre stainless steel reactor is added a slurry of 50 grams of 5% palladium-on-carbon catalyst (Baker and Company, Activity 980) in 360 ml. of water. The mixture is stirred with a magnetic stirrer (Teflon covered magnet) to dissolve the penicillin. Nitrogen is flushed into the open reactor and 2,565 ml. of isopropanol are added with stirring. The reactor is sealed, flushed with nitrogen, then with hydrogen and the pressure is brought to about 28 p.s.i.g. with hydrogen.

Stirring is started. The pressure drops rapidly at first, reaching 15 p.s.i.g. in about 20 minutes. Hydrogen takeup is very much slower thereafter, very little being taken up after about 7 hours. The temperature rises, as from an initial temperature of 71° F. to about 90° F. in the first half hour, then slowly drops back. On some runs, the temperature may go higher and it is desirable to provide for cooling.

At the end of about 7 hours the reactor is flushed with nitrogen and 3,250 ml. of isopropanol are added. The mixture is filtered to remove the spent catalyst. A slightly yellow filtrate is recovered, containing the desired potassium p-aminobenzyl penicillin.

This filtrate is placed in the refrigerator (4° C.) overnight. The next day a slight turbidity appears in the liquid, which is removed by filtration. The clarified filtrate is evaporated in vacuo at about 20 mm. of mercury with a bath temperature at about 40° C., to reduce the volume to about 600 ml. and the water content to about 3% to 5% water. By this time white crystals of potassium p-aminobenzyl penicillin will have appeared in the concentrate. The mixture is filtered, and the crystals are washed with isopropanol and dried at 100° C. in vacuo. The yield is 55 grams of potassium p-aminobenzyl penicillin which assays 1,000 units per mg. and the activity of which is substantially 100% in the hydrophilic penicillin X zone on chromatographic analysis.

EXAMPLE 4

*Acid p-aminobenzyl penicillin. Ethyl acetate solvent. Carbon-palladium catalyst*

Crystalline ammonium p-nitrobenzyl penicillin, assaying 1,920 units per mg. and showing 85.6% of its activity in the penicillin G zone on chromatographic analysis, was converted to the acid form for hydrogenation. A solution of 1.0 gram of the ammonium p-nitrobenzyl penicillin in 10 ml. of water was mixed with 50 ml. of distilled ethyl acetate, and the mixture was cooled and was emulsified by stirring. The penicillin salt was converted to the acid form by the addition of 3.2 ml. of 10% phosphoric acid, which brought the acidity of the aqueous phase of the mixture to pH 2.2. The p-nitrobenzyl penicillin acid is taken up in the ethyl acetate phase of the mixture, and this phase was separated from the aqueous phase, dried with anhydrous sodium sulphate, and filtered. The volume of the ethyl acetate phase was 52 ml. To this was added 0.5 gram of carbon-palladium catalyst, and the mixture was subjected to hydrogenation with hydrogen, under an initial pressure of 15 p.s.i.g. The mixture was continuously stirred, and the hydrogenation was continued until the rate of hydrogen uptake as indicated by falling pressure had substantially ceased. The reaction mixture was then filtered to remove the carbon-palladium catalyst. The filtrate consisted of an ethyl acetate solution containing p-aminobenzyl penicillin acid.

The filtrate was extracted with 5 ml. of 0.4-normal potassium bicarbonate solution, which converted the acid penicillin product to its potassium salt. The mixture separated into two phases, and the aqueous phase containing the potassium p-aminobenzyl penicillin was recovered in a volume of about 5 ml. The aqueous solution had a pH of 7.0 and contained 97,000 units of penicillin per ml. Chromatographic analysis showed 76% of the activity present to be in the penicillin X zone. From this aqueous solution, the p-aminobenzyl penicillin salt is recovered as a solid in the manner set forth in previous examples.

EXAMPLE 5

*Sodium p-aminobenzyl penicillin*

Example 4 is repeated, save that the filtered ethylacetate hydrogenation mixture, instead of being extracted with potassium bicarbonate solution, is extracted with sodium bicarbonate solution. In this way, the p-aminobenzyl penicillin acid in the ethyl acetate solution is converted to the sodium salt, and this is taken up and separated in the aqueous extract. The sodium p-aminobenzyl penicillin may be recovered from the aqueous extract by freeze drying.

EXAMPLE 6

*Ammonium p-aminobenzyl penicillin. Aqueous n-butanol solvent. Carbon-palladium catalyst*

Crystalline ammonium p-nitrobenzyl penicillin assaying 1,760 units per mg. is used as the starting material. A solution of 1.0 gram of the ammonium p-nitrobenzyl penicillin is prepared in 50 ml. of n-butanol saturated with water. The solution had a pH of 6.87, and this was adjusted to a pH of 6.0 by the addition of glacial acetic acid. To this solution was added 0.5 gram of carbon-palladium catalyst, and the mixture was hydrogenated with hydrogen, at an initial pressure of 15 p.s.i.g. The hydrogenation was continued, with stirring, until the hydrogen up-take had substantially ceased. The mixture was then filtered to remove the catalyst, and the catalyst was washed with a small quantity of n-butanol saturated with water, and the washings were added to the filtrate. This gave 58.5 ml. of filtrate solution, at pH 6.23, which contained the desired ammonium p-aminobenzyl penicillin. The solution assayed 10,000 units of penicillin per ml., and on chromatographic analysis 76.6% of the activity appeared in the hydrophilic penicillin X zone, indicating a high degree of conversion.

The aqueous n-butanol solution thus obtained was evaporated in vacuo to a small volume, which caused a solid precipitate to occur. The solid precipitate was slurried with methyl amyl acetate and filtered. The residue was washed with additional methyl amyl acetate, and then dried overnight in vacuo. This gave 0.41 grams of solid material which assayed 530 units per mg. and which consisted essentially of ammonium p-aminobenzyl penicillin. On chromatographic analysis, 93% of the activity appeared in the hydrophilic penicillin X zone, indicating that a high degree of conversion to the desired ammonium p-aminobenzyl penicillin had been obtained.

EXAMPLE 7

*Potassium p-aminobenzyl penicillin. Water solvent. Carbon-palladium catalyst*

Potassium p-nitrobenzyl penicillin which assayed 2,054 units per mg. and which on chromatographic analysis appeared 100% in the penicillin G zone, was used as the starting material. A 100-gram portion of such starting material and 50 grams of carbon-palladium catalyst were mixed with 2500 ml. of distilled water and stirred to dissolve the penicillin. The resulting mixture was subjected to hydrogenation with hydrogen under an initial pressure of 15 p.s.i.g. Hydrogenation was continued with stirring until hydrogen up-take substantially ceased. The reaction mixture was then filtered to remove the catalyst, and the catalyst was washed with 100 ml. of water, and the washing added to the filtrate. This gave 2,580 ml. of aqueous solution of reddish color, having an acidity of pH 6.86. Such solution was dried in vacuo from the frozen state. The freeze drying yielded 80 grams of solid material which assayed 400 units of penicillin per mg. On chromatographic analysis, 91.8% of the activity appeared in the hydrophilic penicillin X zone, indicating a high degree of conversion of the original potassium p-nitrobenzyl penicillin to the desired potassium p-aminobenzyl penicillin. Spectrophotometric analysis showed the material to have an ultraviolet absorption maximum at about 238 millimicrons, corresponding to a maximum of 236 millimicrons found for p-aminophenyl acetic acid, which indicated the presence of the p-aminobenzyl group in the penicillin product.

EXAMPLE 8

*Potassium p-aminobenzyl penicillin. Aqueous ethyl alcohol solvent. Platinum dioxide catalyst*

A mixture of 1.11 grams of potassium p-nitrobenzyl penicillin and 50 mg. of platinum dioxide was mixed with 30 ml. of aqueous ethyl alcohol solvent containing 90% alcohol and 10% water. The mixture was then hydrogenated with hydrogen under an initial pressure of about 15 p.s.i.g. The hydrogenation was continued, with stirring, until up-take of hydrogen substantially ceased. The reaction mixture was then filtered to remove the catalyst, and the catalyst was washed with additional solvent and the washings were added to the filtrate. Sufficient additional 90% ethyl alcohol was added to make a total volume of 50 ml. This solution assayed 19,700 units of penicillin per ml. On chromatographic analysis, 80.8% of the activity appeared in the hydrophilic penicillin X zone, indicating a high degree of conversion of the original potassium n-nitrobenzyl penicillin to the desired potassium p-aminobenzyl penicillin. The potassium p-aminobenzyl penicillin is recovered by the procedures set forth in Examples 1 and 2.

EXAMPLE 9

*Platinum on alumina catalyst*

The procedure of Example 1 is repeated, save that instead of using carbon-palladium catalyst, the catalyst used is 5% platinum on alumina. The hydrogenation proceeds, as in Example 1, to convert the p-nitrobenzyl penicillin to the p-aminobenzyl penicillin, and this is recovered in the manner set forth in Example 1.

EXAMPLE 10

*Potassium p-aminobenzyl penicillin. Aqueous methyl alcohol solvent. Carbon-palladium catalyst*

A solution of 1.0 gram of potassium p-nitrobenzyl penicillin (which on chromatographic analysis showed nearly 100% of its activity in the penicillin G zone) in 4.0 ml. of water was mixed with 0.5 gram of 5% palladium-on-carbon catalyst, and 28 ml. of methanol were added. The mixture was hydrogenated in a stainless steel reactor, at room temperature, until no more hydrogen was taken up. The hydrogenation mixture was then filtered, and the filtrate recovered. The filtrate assayed 37,600 units of penicillin per ml. and 95% of the activity appeared in the penicillin X zone on chromatographic analysis, which indicated that the original p-nitrobenzyl penicillin was substantially all converted to the p-aminobenzyl penicillin. The potassium p-aminobenzyl penitained was then hydrogenated. For this purpose, 1 gm. of 5% palladium-on-carbon catalyst and 20 ml. of isopropyl alcohol were added to the 52 ml. of aqueous solution of triethylamine salt of p-nitrobenzyl penicillin. This mixture was hydrogenated with hydrogen in a pressure vessel with stirring at a pressure of 28 p.s.i.g. until no further hydrogen takeup occurred. The catalyst was then removed from the hydrogenation mixture by filtration, and a filtrate of 74 ml. was obtained which assayed 6,760 units of penicillin per ml., giving a total in excess of 500,000 penicillin units. (It is to be noted that pure p-aminobenzyl penicillin has a potency of half that of p-nitrobenzyl penicillin, so that this represents a recovery in excess of half the original pinicillin.) On chromatographic analysis, 100% of the activity appeared in the penicillin-X zone. Ultraviolet absorption analysis gave a typical curve characteristic of p-aminobenzyl penicillin, with maxima at 238 and 285 millimicrons. These results showed that the p-nitrobenzyl penicillin in the form of the triethylamine salt had been converted to p-aminobenzyl penicillin.

EXAMPLE 14

*Methylamine salt of p-aminobenzyl penicillin. Aqueous isopropyl alcohol solvent. Carbon-palladium catalyst*

The first part of Example 13 was repeated, to obtain an amyl acetate solution of p-nitrobenzyl penicillin acid, and 10 ml. of water was added to this organic solution. A 33% solution of methylamine was diluted with 14 parts of water, and quantities of such solution were added with vigorous stirring to the amyl acetate solution until the pH of the aqueous phase of the mixture was pH 7.6. This converted the penicillin acid to the methylamine salt, which was extracted into the aqueous phase, and such aqueous phase having a volume of 23.6 ml. was recovered from the reaction mixture. It assayed 55,080 units of penicillin activity per ml., 100% of which appeared in the penicillin-G zone on chromatographic analysis. Ultraviolet analysis showed the typical curve of p-nitrobenzyl penicillin. A total of 1,300,000 units of penicillin was present.

The aqueous solution was mixed with 25 ml. of water, 20 ml. of isopropyl alcohol, and 1 gm. of 5% palladium-on-carbon catalyst, and the resulting mixture was subjected to hydrogenation with hydrogen in a pressure vessel at approximately 28 p.s.i.g. until no further hydrogen takeup occurred, which converted the p-nitrobenzyl penicillin in the form of the methylamine salt to p-aminobenzyl penicillin.

The reaction mixture was filtered to remove the catalyst, and 68 ml. of filtrate was obtained containing the methylamine salt of p-aminobenzyl penicillin. The filtrate assayed 5,850 units of penicillin activity per ml. On chromatographic analysis, substantially 100% of the penicillin activity appeared in the penicillin-X zone, with a slight trace in the penicillin-G zone. Ultraviolet anaylsis showed the typical curve for p-aminobenzyl penicillin.

EXAMPLE 15

*Diethylamine salt of p-aminobenzyl penicillin. Aqueous isopropyl alcohol solvent. Carbon-palladium catalyst*

An amyl acetate solution of p-nitrobenzyl penicillin acid was prepared as in Example 13, and to this was added 10 ml. of water. An aqueous solution of diethylamine was prepared containing 7.2 ml. of diethylamine in 200 ml. of solution, and a portion of such solution was added to the mixture of water and amyl acetate solution of the penicillin acid to adjust the pH of the aqueous phase to pH 6.4. This produced the diethylamine salt of p-nitrobenzyl penicillin, which was extracted into the aqueous phase of the reaction mixture. Such aqueous phase was recovered from the mixture, in a volume of 18.5 ml. It assayed 63,100 units of penicillin per ml., giving a total of 1,170,000 units of penicillin activity. On chromatographic analysis, 100% of the activity appeared in the penicillin-G zone. Ultraviolet absorption analysis gave a typical curve for p-nitrobenzyl penicillin.

This aqueous solution containing the diethylamine salt of p-nitrobenzyl penicillin was mixed with 30 ml. of water and 20 ml. of isopropyl alcohol, and the mixture was subjected to hydrogenation in the same manner as in Example 13. This yielded an aqueous solution of diethylamine salt of p-aminobenzyl penicillin in a volume of 84 ml., which assayed 6,010 units of penicillin activity per ml., 100% of which appeared in the penicillin-X zone on chromatographic analysis. Ultraviolet analysis showed a typical curve for p-aminobenzyl penicillin. The aqueous solution contained a total of 504,000 units of penicillin activity, representing a recovery from the hydrogenation step of the order of 85%, taking into account the lower potency of the p-aminobenzyl penicillin produced.

EXAMPLE 16

*Benzylamine salt of p-aminobenzyl penicillin. Aqueous isopropyl alcohol solvent. Carbon-palladium catalyst*

An amyl acetate solution of p-nitrobenzyl penicillin acid, prepared as in Example 13, was mixed with 20 ml. of water. An aqueous solution was prepared containing 7.66 ml. of benzylamine in 200 ml. of solution, and a sufficient amount of such solution was vigorously stirred with the amyl acetate solution to bring the pH of the aqueous phase of the mixture to pH 7.25. This extracted the penicillin into the aqueous phase in the form of the benzylamine salt of p-nitrobenzyl pencillin, and the aqueous phase was recovered. The aqueous phase had a volume of 26 ml. and assayed 54,280 units per ml., giving a total potency of 1,410,000 penicillin units. On chromatographic analysis, substantially 100% of the penicillin activity appeared in the penicillin-G zone, with a trace in the penicillin-X zone. Uutraviolet analysis showed a typical curve for p-nitrobenzyl penicillin. Hydrogenation was carried out in the same manner as in Example 13, using 20 ml. of added water and 20 ml. of isopropyl alcohol, and using carbon-palladium catalyst. The hydrogenation mixture, after removal of the catalyst, yielded 110 ml. of aqueous solution which assayed 4,030 units of penicillin per ml. On chromatographic analysis, 100% of the activity appeared in the penicillin-X zone. Ultraviolet analysis showed a typical curve for p-aminobenzyl penicillin. The total potency present amounted to 443,000 units of penicillin activity. These results show that in the benzylamine salt of p-nitrobenzyl penicillin the nitro radical had been converted to the amino radical, to change the p-nitrobenzyl penicillin compound to a p-aminobenzyl penicillin compound.

EXAMPLE 17

*Piperidine salt of p-aminobenzyl penicillin. Aqueous isopropyl alcohol solvent. Carbon-palladium catalyst*

An amyl acetate solution of p-nitrobenzyl penicillin acid, prepared as in Example 13, was mixed with 20 ml. of water. An aqueous solution was prepared containing 6.92 ml. of piperidine in 200 ml. of solution, and 8 ml. of this solution was added with vigorous stirring to the amyl acetate and water mixture, to bring the pH of the aqueous phase of the mixture to pH 7.2. The aqueous phase was recovered in a volume of 30 ml., and contained the piperidine salt of p-nitrobenzyl penicillin, assaying 54,700 units per ml. of solution. The total potency present was 1,640,000 units. On chromatographic analysis 100% of the activity appeared in the penicillin-G zone, and ultraviolet analysis gave a typical curve for p-nitrobenzyl penicillin. Hydrogenation was carried out as in Example 13, using 20 ml. of added water and 20 ml. of isopropyl alcohol, and using carbon-palladium catalyst. The hydrogenation mixture, after removal of the catalyst, yielded 87.5 ml. of aqueous solution of the piperidine salt of p-aminobenzyl penicilcillin contained in the filtrate is recovered by freeze drying.

EXAMPLE 11

*Methyl ester of p-aminobenzyl penicillin. Aqueous ethyl alcohol solvent. Carbon-palladium catalyst*

An aqueous solution of potassium p-nitrobenzyl penicillin was acidified and extracted with amyl acetate, to obtain an amyl acetate solution of p-nitrobenzyl penicillin acid. To this solution was added an excess of diazomethane in ether, and the resulting reaction mixture was concentrated in vacuum to an amber syrup, consisting of a solution of the methyl ester of p-nitrobenzyl penicillin in amyl acetate. Ultraviolet absorption analysis of this solution indicated the presence of the p-nitrophenyl moiety. The material had the characteristic behavior of esters of penicillin when assayed for penicillin activity, that is, the material showed only traces of activity when assayed in aqueous solution, but when guinea pig serum was added to the aqueous solution—to hydrolyze the ester—the material then showed strong activity, in this case about 480 units per mg.

A 1.12-gram portion of the syrup obtained as set forth above was dissolved in 30.0 ml. of ethanol, and 0.5 gram of 5% palladium-on-carbon catalyst was added. The mixture was then hydrogenated in the same way as in previous examples until no more hydrogen was taken up. The catalyst was removed by filtration and the filtrate was evaporated to dryness. This gave 0.41 gram of a yellow, slightly tacky powder, consisting essentially of the methyl ester of p-aminobenzyl penicillin. This had absorption maxima in the regions of 240 and 286 millimicrons, which indicated the presence of the p-aminophenyl moiety. The material had the characteristic behavior of esters of penicillin upon assay for penicillin activity as noted above, and after treatment with guinea pig serum, the material assayed 625 units per mg. of the powder material obtained.

EXAMPLE 12

*Potassium p-aminobenzyl penicillin. Aqueous ethyl alcohol solvent. Platinum-black catalyst*

In accordance with the general procedure set forth in Examples 1 to 3, potassium p-nitrobenzyl penicillin was converted to potassium p-aminobenzyl penicillin by hydrogenation, using aqueous ethyl alcohol as the solvent and platinum-black as the catalyst. The resulting potassium p-aminobenzyl penicillin was recovered and purified by crystallization from aqueous acetone. The crystalline material obtained from the aqueous acetone was dissolved in water, and potassium acetate was added to the aqueous solution to cause precipitation of the potassium p-aminobenzyl penicillin therefrom. Microbiological assays of recrystallized products obtained in this way on several runs gave values averaging 977±70 units per mg.

Microanalytical analyses of crystalline material (900 u./mg.) obtained as set forth above, dried for one hour at 56° C. at 0.1 mm. of mercury, gave the following values: C, 50.05; H, 5.18; N, 10.58; S, 8.44. The calculated values for $C_{16}H_{18}N_3O_4SK$ (mol. wt. 387.5) are: C, 49.59; H, 4.68; N, 10.84; S, 8.27.

The infra-red absorption spectrum was determined with an infra-red spectrophotometer. The absorption maxima observed, as tabulated below, are those to be expected from the molecular structure of p-aminobenzyl penicillin as a salt. In particular, the band in the 3 micron region substantiates the presence of an amide NH group and an $NH_2$ group. The band at 5.67 micron is in harmony with the lactam structure in the penicillin molecule. The other characteristic bands observable with amides are present in the 6.1–6.3 micron region. The following table gives the principal absorption bands observed.

PRINCIPAL INFRA-RED ABSORPTION BANDS IN MICRONS OF p-AMINOBENZYL PENICILLIN CRYSTALLIZED FROM AQUEOUS POTASSIUM ACETATE AND DETERMINED AS A MINERAL OIL MULL

| | | |
|---|---|---|
| 2.79 | 6.62 | 9.14 |
| 3.00 | 7.53 shoulder | 9.24 |
| 3.08 | 7.61 | 10.00 weak |
| 3.20 | 7.80 | 10.47 weak |
| 5.67 | 8.07 | 10.66 weak |
| 6.13 | 8.32 | 11.20 |
| 6.22 | 8.38 | 11.86 |
| 6.34 | 8.91 weak | |

Electrometric titration in water showed the presence of two ionizable groups having $pK'_a$ values of 4.6 and 2.6. These values confirm the presence of the phenyl amino and the carboxyl groups.

The ultraviolet absorption spectrum was determined with a recording ultraviolet spectrophotometer. In methanol solution, the maxima and minima were as given below.

| $\lambda$ max. $(\mu)$ | log $\epsilon$ | $\lambda$ min. $(\mu)$ | log $\epsilon$ |
|---|---|---|---|
| 239 | 4.02 | 219 | 3.76 |
| 288 | 3.16 | 272 | 3.03 |

X-ray diffraction studies showed the crystalline structure, both for the material first obtained from the aqueous acetone crystallization step and for the material obtained by recrystallization from water by the use of potassium acetate.

The various data found, as set forth above shows clearly that the product obtained was crystalline p-aminobenzyl penicillin in the form of its potassium salt.

EXAMPLE 13

*Triethylamine salt of p-aminobenzyl penicillin. Aqueous isopropyl alcohol solvent. Carbon-palladium catalyst*

The starting material used was potassium p-nitrobenzyl penicillin which assayed 1830 units of penicillin activity per mg. and 100% of which activity appeared in the penicillin-G zone on chromatographic analysis. Ultraviolet absorption analysis of this material gave a typical curve having the bands characteristic of p-nitrobenzyl penicillin. One gram of such potassium p-nitrobenyl penicillin was dissolved in 20 ml. of water, and 50 ml. of amyl acetate ("pentasol" acetate) was added. To the resulting mixture, 3.0 ml. of 10% (by volume) phosphoric acid solution was added, with vigorous stirring, to bring the pH of the water phase to 2.1. This converted the penicillin salt to the p-nitrobenzyl penicillin acid, which was taken up in solution in the organic phase of the mixture. This amyl acetate solution of p-nitrobenzyl penicillin acid was separated from the water phase as an intermediate for further reaction.

To this amyl acetate solution was added, with vigorous stirring, a solution of 1 ml. of triethylamine in 100 ml. of water. A total of 42 ml. of the triethylamine solution was added, which brought the pH of the aqueous phase of the mixture to pH 7.3, and converted the p-nitrobenzyl penicillin acid to the triethylamine salt of p-nitrobenzyl penicillin. This salt was taken up in solution in the aqueous phase of the mixture, and such aqueous phase, having a volume of 52 ml., was recovered from the mixture. It assayed 35,190 units of penicillin activity per ml., giving a total potency present of 1,830,000 penicillin units. On chromatographic analysis, 100% of the activity appeared in the pencillin-G zone. Ultraviolet absorption analysis of this triethylamine salt again showed a typical curve characteristic of p-nitrobenzyl penicillin. Substantially 100% of the original penicillin activity was thus transferred from the original potassium p-nitrobenzyl penicillin to the triethylamine salt.

The triethylamine salt of p-nitrobenzyl penicillin so oblin. The solution assayed 5,470 units per ml., and the total potency present amounted to 478,000 units. 100% of the activity appeared in the penicillin-X zone on chromatographic analysis, and ultraviolet analysis showed a typical curve for p-aminobenzyl penicillin.

EXAMPLE 18

*Allylamine salt of p-aminobenzyl penicillin. Aqueous isopropyl alcohol solvent. Carbon-palladium catalyst*

An amyl acetate solution of p-nitrobenzyl penicillin acid was prepared as in Example 13, and 20 ml. of water was added to it. An aqueous solution of 5.25 ml. of allylamine in 200 ml. of solution was prepared, and 8 ml. of such solution was vigorously stirred into the amyl acetate and water mixture, to bring the pH of the aqueous phase to pH 8.0. This extracted the penicillin into the aqueous phase as the allylamine salt of p-nitrobenzyl penicillin. The aqueous phase was recovered in a volume of 27 ml. and assayed 55,150 units of penicillin per ml. The total potency present was 1,490,000 penicillin units. On chromatographic analysis, 100% of the activity appeared in the penicillin-G zone, and ultravoilet analysis gave a typical curve for p-nitrobenzyl penicillin. Hydrogenation was carried out as in Example 13, using 20 ml. of added water and 20 ml. of isopropyl alcohol, and using carbon-palladium catalyst. The hydrogenation mixture, after removal of the catalyst, yielded 106 ml. of filtrate which assayed 4,830 units per ml. The total potency present was 512,000 penicillin units. On chromatographic analysis, 100% of the activity appeared in a single zone, and ultraviolet analysis gave a typical curve for p-aminobenzyl penicillin. These results show that in the allylamine salt of p-nitrobenzyl penicillin, the nitro radical had been converted to the amino radical, to change the p-nitrobenzyl penicillin compound to a p-aminobenzyl penicillin compound.

EXAMPLE 19

*Dodecylamine salt of p-aminobenzyl penicillin. Ethyl acetate isopropyl solvent. Carbon-palladium catalyst*

One gram of potassium p-nitrobenzyl penicillin was dissolved in 20 ml. of water, and 50 ml. of ethyl acetate was added. To this mixture, 3.0 ml. of 10% (by volume) phosphoric acid was added with vigorous stirring to bring the pH of the aqueous phase to 2.25. This converted the penicillin to the acid, which was taken up in the ethyl acetate layer, and such ethyl acetate layer was recovered. A solution of dodecylamine in ethyl acetate was prepared containing 13.0 cc. of dodecylamine in 300 ml. of solution. This dodecylamine solution was filtered, and 16 ml. of the filtered solution was added to the ethyl acetate solution of p-nitrobenzyl penicillin acid with vigorous stirring, to bring the pH of the ethyl acetate mixture to 6.70. Ethyl acetate lost by evaporation was replaced, to bring the volume to 54 ml. This gave an ethyl acetate solution of the dodecylamine salt of p-nitrobenzyl penicillin, which assayed 29,650 units per ml. On chromatographic analysis, substantially 100% of the penicillin activity appeared in the penicillin-G zone, with a slight trace in the penicillin-X zone. 20 ml. of isopropyl alcohol and 1 gm. of 5% palladium-on-carbon catalyst was added to the ethyl acetate solution and this mixture was subjected to hydrogenation as in example 13. The hydrogenation mixture was filtered to remove the catalyst, and the catalyst was washed with small quantities of ethyl acetate. The combined filtrate and wash liquid, amounting to 106 ml., was concentrated in vacuo to 39.5 ml. The concentrated solution assayed 6,040 units of penicillin per ml., giving a total potency of 238,000 units. On chromatographic analysis, substantially 100% of the activity appeared in the penicillin-X zone, with a trace in the penicillin-G zone, and a slight trace in the penicillin-F zone. These results show that in the dodecylamine salt of p-nitrobenzyl penicillin, the nitro radical had been converted to the amino radical, to change the p-nitrobenzyl penicillin compound to a p-aminobenzyl compound.

The p-aminobenzyl penicillin produced in accordance with the foregoing examples undergoes various reactions involving its carboxyl functional group, in the same way as other penicillins. In addition, it undergoes various types of reactions involving its p-aminobenzyl group, and thus makes available various derivatives. Reactions involving the p-aminobenzyl group are illustrated by the following:

A. REACTIONS WITH DIAZONIUM SALTS

(1) *Production of 3-(4-nitrophenylazo)-4-aminobenzyl penicillin*

*Procedure a.*—The starting material is potassium p-aminobenzyl penicillin which assayed 750 units per mg., with 97.1% of its activity appearing in the penicillin-X zone on chromatographic analysis. To a solution of 1.0 gram of such starting material in 10.0 ml. of water there was added slowly and with stirring a solution of 0.61 gram of p-nitrobenzenediazonium fluoroborate in 50 ml. of water. A brick-red precipitate formed, and this was recovered by filtration. The pH of the filtrate was 3.1. The precipitate was washed with small portions of cold water and then dried in vacuo over calcium chloride.

The yield was 0.82 gram of brick-red material which assayed 655 units per mg. (using penicillin G test-response standards). On chromatographic analysis 85.8% of the activity appeared in an elongated zone in the penicillin K position, and only 9.0% in the penicillin-X zone. The material showed an absorption maximum at about 390 millimicrons, which corresponded to a similar maximum found for p-nitrobenzenediazonium fluoroborate.

*Procedure b.*—Potassium p-aminobenzyl penicillin which assayed 960 units per mg. and showed 98.5% of its activity in the penicillin-X zone on chromatographic analysis was used as the starting material. A 2-gram quantity of this penicillin was added to a solution of 3.0 grams of potassium acetate in 20 ml. of water. The resulting solution was cooled in an ice-water bath, and to it was added a solution of 1.22 grams of p-nitrobenzenediazonium fluoroborate in 100 ml. of cold water. The resulting mixture was a viscous red liquid. This was kept at about 10° C. for two hours. The pH was 5.3. Then 10 ml. of glacial acetic acid were added, and the viscous red liquid changed to a jelly-like orange-colored mass. This was placed in the refrigerator overnight. It was then filtered, washed with distilled water, pressed with a rubber dam, and dried in vacuo over calcium chloride.

This yielded 2.5 grams of brick-red material, which assayed about 1,400 unit per mg. (using penicillin-G test-response standards). On chromatographic analysis, the activity appeared in an elongated zone between the dihydro-penicillin-F and the penicillin-K positions. The material showed an absorption maximum at about 390 millimicrons, indicating the presence of the p-nitrophenylazo group.

The results of Procedures *a* and *b* above show the p-aminobenzyl group of the original p-aminobenzyl penicillin undergoes a coupling reaction with the diazonium salt, to produce an active different penicillin containing the p-nitrophenylazo radical from the diazonium salt.

(2) *Production of 3-(3-quinolyl-azo)-4-aminobenzyl penicillin*

To 1.55 grams of 3-aminoquinoline were added 3.0 ml. of concentrated hydrochloric acid and 10.0 ml. of distilled water, and the mixture was stirred and cooled by the addition of ice. A solution of 0.756 gram of sodium nitrite in 15.0 ml. of distilled water was then added slowly, drop by drop, and the sodium nitrite vessel was rinsed with 5 ml. of water and the rinse water was to the solution. The mixture contained an excess of nitrous acid, which was discharged by adding a pinch of 3-aminoquinoline. This solution, containing quinolinediazonium chloride, was diluted to 40 ml. with distilled water, and kept cold.

A 1-gram quantity of potassium p-aminobenzyl penicillin (750 units per mg.; 95.5% X-zone) was dissolved in 30 ml. of water, and 1.0 gram of potassium bicarbonate was added. The resulting solution was cooled and stirred, and to it was added 9.6 ml. of the quinolinediazonium chloride solution, keeping the temperature of the mixture below 8° C., which caused a reddish color to form in the mixture. The mixture was stirred for one-half hour, and then diluted to a volume of 50 ml. with water.

To 25 ml. of the red-colored solution obtained as set forth above there was added 175 ml. of water and 3.0 ml. of glacial acetic acid. This caused the formation of a precipitate, which was recovered by filtration, washed with water, and dried in vacuo over calcium chloride. This yielded 0.45 gram of orange-colored material which assayed 513 units per mg. and which on chromatographic analysis showed 44% of its activity in the penicillin-X zone and 56% in the penicillin-G zone. The material had an absorption maximum at about 360 millimicrons, which is a maximum not found with p-aminobenzyl penicillin.

These results show that reaction of the p-aminobenzyl penicillin and the diazonium salt had occurred, to produce an active different penicillin.

B. REACTIONS TO FORM DIAZONIUM SALTS OF p-AMINOBENZYL PENICILLIN, AND REACTIONS THEREOF WITH PHENOLS

(1) Production of 4-(4-hydroxyphenylazo)-benzyl penicillin

A phenol solution was prepared containing 1.50 gram of potassium bicarbonate and 0.24 gram of phenol in 10.0 ml. of water, and the solution was cooled in an ice-water bath.

A solution of 1.0 gram of potassium p-aminobenzyl penicillin in 5.0 ml. of water was cooled to −2° C. To this solution, in the cold, were added 0.85 ml. of concentrated hydrochloric acid, then 0.18 gram of sodium nitrite dissolved in 1 ml. of water. A slurry resulted, containing the diazonium salt of p-aminobenzyl penicillin. This was stirred for a minute and was then poured immediately into the phenol solution. A vigorous evolution of gas took place, and a bright red-colored solution resulted. This solution was allowed to stand in the cold for three hours, and was then acidified to pH 2.9 with 20% phosphoric acid. This produced a red precipitate, which was recovered by filtration, washed with water, and dried in vacuo over calcium chloride.

The yield was 0.9 gram of red powder. This was assayed by the cup-plate method, using penicillin-G test-response standards, and gave values varying from 509 to 1,850 units per mg., which indicated penicillin activity having a different test-response curve from that of penicillin G. Chromatographic analysis showed 92.3% of the activity in an elongated zone below the penicillin-G zone.

The original p-aminobenzyl penicillin had thus been converted to a diazonium salt, and this reacted with the phenol to produce an active different penicillin.

C. ACYLATION REACTIONS

(1) Preparation of 4-benzamidobenzyl penicillin

Potassium p-aminobenzyl penicillin which assayed 955 units per mg. and which on chromatographic analysis showed 100% of its activity in the penicillin-X zone, was used as the starting material. A 0.52-gram quantity of this penicillin, containing a total of 486,600 penicillin units (assayed with penicillin-G standards) was dissolved in 2.0 ml. of water and 0.20 gram of potassium bicarbonate was added. To this solution was added 0.15 ml. of benzoyl chloride, and the resulting mixture was shaken to complete solution and until the odor of benzoyl chloride disappeared. Assay of the resulting solution, (using the same penicillin-G standards) showed it to contain a total of 715,000 units, with 90.7% of the units appearing in the penicillin-G zone on chromatographic analysis.

Thus, the original p-aminobenzyl penicillin had undergone acylation with the benzoyl chloride to yield a different penicillin which gave a higher activity response than the original penicillin compound.

(2) Preparation of 4-(3,5-dinitrobenzamido)-benzyl penicillin

To a solution of 0.52 gram of potassium p-aminobenzyl penicillin (containing a total of 486,600 units, with 100% of the activity appearing in the penicillin-X zone on chromatographic analysis) and 0.25 gram of potassium bicarbonate in 2.0 ml. of water were added 0.30 gram of 3,5-dinitrobenzoyl chloride, in small portions, with the reaction mixture cooled in running water. A vigorous evolution of gas occurred, and when this had subsided, the mixture was stirred for an additional one-half hour. During such time, a crystalline precipitate formed. The mixture was placed in a cold room for four hours, and it was then so thick with precipitate that it would not flow easily.

To the thick mixture obtained above, 18 ml. of water were added, which dissolved the precipitate. To the resulting solution, 50 ml. of ethyl acetate were added, and the mixture was then acidified to pH 2.57 by the addition of 10% phosphoric acid, with stirring. The mixture was then allowed to stand, and separated into two layers. The ethyl acetate layer was recovered, and was extracted with 10 ml. of 0.2-normal potassium bicarbonate solution. The extraction gave 10.5 ml. of aqueous concentrate, which assayed 67,550 units per ml. On chromatographic analysis substantially all the activity appeared in the penicillin-G zone. The assay indicated that the aqueous concentrate contained a total of 709,275 units.

A 4.0 ml. portion of this concentrate was mixed with 4.0 ml. of water, and 1.9 ml. of saturated aqueous potassium acetate solution were added. This caused an oily precipitate to form, which crystallized upon standing. The crystalline precipitate was recovered in a centrifuge, was washed with isopropanol and ether, and dried. This yielded 0.16 gram of white material (probably contaminated with potassium acetate) which assayed about 890 units per mg. Upon chromatographic analysis, substantially all of the activity appeared in the penicillin-G zone.

The course and results of this experiment show that the original p-aminobenzyl penicillin underwent reaction with the 3,5-dinitrobenzoyl chloride to yield the different 4-(3,5-dinitrobenzamido)-benzyl penicillin.

(3) Preparation of 4-(4-acetamidobenzenesulphonamido)-benzyl penicillin

To a solution of 0.52 gram of potassium p-aminobenzyl penicillin (containing a total of 486,600 penicillin units, with 100% appearing in the penicillin-X zone on chromatographic analysis) and 0.2 gram of potassium bicarbonate in 2.0 ml. of water were added 0.31 gram of p-acetamidobenzenesulphonyl chloride, while the mixture was being stirred and cooled. An evolution of gas occurred, and when this ceased, the reaction mixture was a clear solution. Assay of this solution showed it to contain a total of 628,500 units, and on chromatographic analysis, the penicillin activity appeared in a zone mid-way between the penicillin-X zone and the penicillin-G zone. The original p-aminobenzyl penicillin had undergone acylation to yield a different penicillin having a different and greater activity response.

We claim as our invention:

1. The process of producing the relatively hydrophilic p-aminobenzyl penicillin, which comprises subjecting p-nitrobenzyl penicillin substantially free from hydrophilic contaminants to hydrogenation with hydrogen in a lower alkyl ester of a lower alkanoic acid as a solvent, in the presence of a catalyst of the platinum-metal group, at a temperature not substantially exceeding 90° F., to convert the ntiro radical of such penicillin to the amino radical, and thereby forming p-aminobenzyl penicillin.

2. The process of producing alkali-metal salts of p-aminobenzyl penicillin, which comprises subjecting an alkali-metal salt of p-nitrobenzyl penicillin substantially free from hydrophilic contaminants to hydrogenation with hydrogen in an aqueous lower alkanol solvent, in the presence of a catalyst of the platinum-metal group, at a temperature not substantially exceeding 90° F., to convert the nitro radical of the penicillin to the amino radical, and thereby forming the corresponding p-aminobenzyl penicillin salt.

3. The process of producing alkali-metal salts of p-aminobenzyl penicillin, which comprises subjecting to hydrogenation with hydrogen an alkali-metal salt of p-nitrobenzyl penicillin in solution in aqueous isopropyl alcohol, with a catalyst of the platinum-metal group, at a temperature not substantially exceeding 90° F., to convert the nitro radical of the penicillin to the amino radical, removing the catalyst from the hydrogenation mixture, and evaporating the remaining hydrogenation mixture to reduce the water content thereof to about 5%, and thereby to precipitate p-aminobenzyl penicillin salt in solid state, and recovering the solid precipitate.

4. The process of producing amine salts of p-aminobenzyl penicillin, which comprises subjecting to hydrogenation with hydrogen a soluble amine salt of p-nitrobenzyl penicillin of the class consisting of alkyl amine salts, alkenyl amine salts, phenyl-lower-alkyl amine salts, cycloalkyl amine salts in which the alkyl radical is an alkyl radical of less than 7 carbon atoms, and amine salts having an amine radical of the formula

in which R represents an alkyl chain of from 3 to 6 carbon atoms, in solution in a solvent of the class consisting of water, lower alkanols, lower alkyl esters of lower alkanoic acids, and mixtures thereof, in the presence of a catalyst of the platinum metal group, at a temperature not substantially exceeding 90° F., to convert the nitro radical of such penicillin to the amino radical.

5. The process of producing p-aminobenzyl penicillin in the form of the acid and carboxy derivatives thereof, which comprises subjecting to hydrogenation with hydrogen a p-nitrobenzyl penicillin compound of the class consisting of the acid, soluble metal salts, lower alkyl esters, alkyl amine salts, alkenyl amine salts, phenyl-lower-alkyl amine salts, cycloalkyl amine salts in which the alkyl radical is an alkyl radical of less than 7 carbon atoms, and amine salts having an amine radical of the formula

in which R represents an alkyl chain of from 3 to 6 carbon atoms, in a solvent of the class consisting of water, lower alkanols, lower alkyl esters of lower alkanoic acids, and mixtures thereof, in the presence of a catalyst of the platinum-metal group, at a temperature not substantially exceeding 90° F., to convert the nitro radical of such compound to the amino radical.

6. The process set forth in claim 5, in which the p-nitrobenzyl penicillin compound used is substantially free of hydrophilic contaminants.

References Cited in the file of this patent
UNITED STATES PATENTS 2,479,296    Behrens et al. _____ Aug. 16, 1949

OTHER REFERENCES

Ellis: Hydrogenation of Organic Substances (1930), pages 259–270.

Brewer et al.: Applied Microbiology, vol. 1 (1953), pages 163–166.

Cahn: An Introduction to Chemical Nomenclature, pages 66–69 (1959).